(12) United States Patent
Buford et al.

(10) Patent No.: US 12,105,687 B2
(45) Date of Patent: Oct. 1, 2024

(54) SYSTEMS AND METHODS FOR AUTOMATED DATA QUALITY SEMANTIC CONSTRAINT IDENTIFICATION USING RICH DATA TYPE INFERENCES

(71) Applicant: JPMORGAN CHASE BANK, N.A., New York, NY (US)

(72) Inventors: John Buford, Somerset, NJ (US); Miguel Villarreal-Vasquez, New York, NY (US); Fenglin Yin, New York, NY (US); Prashant K Dhingra, Redmond, WA (US); Jose Gondin, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 30 days.

(21) Appl. No.: 17/935,724

(22) Filed: Sep. 27, 2022

(65) Prior Publication Data
US 2023/0099164 A1    Mar. 30, 2023

Related U.S. Application Data

(60) Provisional application No. 63/250,065, filed on Sep. 29, 2021.

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC .......................... G06F 16/215; G06F 16/2365
See application file for complete search history.

(56) References Cited

U.S. PATENT DOCUMENTS

| | | | |
|---|---|---|---|
| 10,013,439 B2 * | 7/2018 | Gruenheid | G06F 16/214 |
| 10,332,010 B2 * | 6/2019 | Yan | G06N 5/025 |
| 11,106,643 B1 * | 8/2021 | Heller | G06Q 10/06395 |
| 2009/0024551 A1 * | 1/2009 | Agrawal | G06N 5/02 707/999.1 |
| 2012/0102002 A1 * | 4/2012 | Sathyanarayana | G06F 16/215 707/687 |
| 2016/0246823 A1 * | 8/2016 | Varghes | G06F 16/215 |
| 2017/0228821 A1 * | 8/2017 | Reimer | G06Q 10/063 |

(Continued)

*Primary Examiner* — Huawen A Peng
(74) *Attorney, Agent, or Firm* — GREENBERG TRAURIG LLP

(57) ABSTRACT

Systems and methods for automated data quality semantic constraint identification using rich data type inferences are disclosed. In one embodiment, a method for automated data quality analysis may include: (1) receiving, by a data quality engine computer program, reference data from a data source, wherein the reference data comprises a plurality of columns; (2) inferring, by the data quality engine computer program, a rich data type for each of the plurality of columns, wherein the rich data type has a specific format, a content constraint, and/or a specific application; (3) applying, by the data quality engine computer program, a data quality constraint to each column based on the rich data type for the column; (4) updating, by the data quality engine computer program, the reference data with production data; and (5) identifying, by the data quality engine computer program, a data quality issue in the production data.

20 Claims, 3 Drawing Sheets

(56) References Cited

U.S. PATENT DOCUMENTS

| | | | |
|---|---|---|---|
| 2018/0189332 A1* | 7/2018 | Asher | G06F 16/215 |
| 2021/0034603 A1* | 2/2021 | Mercier | G06F 16/2365 |
| 2021/0200744 A1* | 7/2021 | Gubba | G06F 16/2365 |
| 2021/0263900 A1* | 8/2021 | Joyce | G06F 16/2228 |
| 2022/0214874 A1* | 7/2022 | Jayapandy | G06F 8/77 |
| 2022/0335023 A1* | 10/2022 | Knox | G06F 8/77 |
| 2022/0374401 A1* | 11/2022 | Oberhofer | G06F 16/285 |

* cited by examiner

SYSTEMS AND METHODS FOR AUTOMATED DATA QUALITY SEMANTIC CONSTRAINT IDENTIFICATION USING RICH DATA TYPE INFERENCES

RELATED APPLICATIONS

This application claims priority to, and the benefit of, U.S. Provisional Patent Application Ser. No. 63/250,065, filed Sep. 29, 2021, the disclosure of which is hereby incorporated, by reference, in its entirety.

BACKGROUND OF THE INVENTION

1. Field of the Invention

Embodiments generally relate to systems and methods for automated data quality semantic constraint identification using rich data type inferences.

2. Description of the Related Art

Enterprises collect increasing amounts of digital data about their business operations. This data is used in many business processes, including decision making performed or augmented by machine learning (ML) models. Supervised ML models may also be trained on selected data sets.

Performance of ML models and business processes that depend on enterprise data is impacted by errors and omissions in the data. To reduce operations cost to check and correct data and to reduce the time from when raw data is available to when it is sufficiently validated to be used to either train or deploy ML models using the data, data is checked at different stages. Typical checks include statistical, missing data, range checks, encoding errors, outliers, anomalies, and relationship between data fields. The variation in the volume of the data may also be checked. Data checks may be based on inherent characteristics of the data such as the schema type (e.g., integer, floating point, string, Boolean, etc.).

Data quality checks are difficult to automate with the common schema attributes. For example, limitations may include: (1) difficulty in determining if a business rule on the data is satisfied, (2) difficulty in determining if a new value in a categorical variable is permitted; (3) difficulty in determining if a syntax or format of the data is correct for its semantic use; (4) difficulty in determining if the data has a valid semantic interpretation; (5) difficulty in determining detecting data drift at a semantic level over time; and (6) difficulty in determining detecting noise in semantic attributes.

SUMMARY OF THE INVENTION

Systems and methods for automated data quality semantic constraint identification using rich data type inferences are disclosed. In one embodiment, a method for automated data quality analysis may include: (1) receiving, by a data quality engine computer program, reference data from a data source, wherein the reference data may include a plurality of columns; (2) inferring, by the data quality engine computer program, a rich data type for each of the plurality of columns, wherein the rich data type has a specific format, a content constraint, and/or a specific application; (3) applying, by the data quality engine computer program, a data quality constraint to each column based on the rich data type for the column; (4) updating, by the data quality engine computer program, the reference data with production data; and (5) identifying, by the data quality engine computer program, a data quality issue in the production data.

In one embodiment, the rich data type for a first column of the plurality of columns may be based on a format of the first column, column name heuristics, pattern matching, and/or consistency of data in the first column with a second column of the plurality of columns.

In one embodiment, the production data may be validated using one or more unit test.

In one embodiment, the step of identifying a data quality issue in the production data may include determining whether the production data complies with the data quality constraint using one or more unit test.

In one embodiment, the step of identifying a data quality issue in the production data may include detecting an anomaly in the production data.

In one embodiment, the method may also include correcting, by the data quality engine computer program, the data quality issue in the production data by inserting corrected values to correct the data quality issue into a production data stream of the production data and delivering the production data stream.

In one embodiment, the data quality engine computer program replaces an anomalous data element in the production data with a corrected data element in the production data stream.

In one embodiment, the method may also include notifying, by the data quality engine computer program, a data owner of the data quality issue by out of band notification.

In one embodiment, the data quality constraint may be identified from a mapping of constraints to rich data types.

In one embodiment, the data quality constraint may be applied to a plurality of the columns.

According to another embodiment, a non-transitory computer readable storage medium, including instructions stored thereon, which when read and executed by one or more computer processors, cause the one or more computer processors to perform steps comprising: receiving reference data from a data source, wherein the reference data may include a plurality of columns; inferring a rich data type for each of the plurality of columns, wherein the rich data type has a specific format, a content constraint, and/or a specific application; applying a data quality constraint to each column based on the rich data type for the column; updating the reference data with production data; and identifying a data quality issue in the production data.

In one embodiment, the rich data type for a first column of the plurality of columns may be based on a format of the first column, column name heuristics, pattern matching, and/or consistency of data in the first column with a second column of the plurality of columns.

In one embodiment, the production data may be validated using one or more unit test.

In one embodiment, identifying a data quality issue in the production data may include determining whether the production data complies with the data quality constraint using one or more unit test.

In one embodiment, identifying a data quality issue in the production data may include detecting an anomaly in the production data.

In one embodiment, the non-transitory computer readable storage medium may also include instructions stored thereon, which when read and executed by one or more computer processors, cause the one or more computer processors to correct the data quality issue in the production data by inserting corrected values to correct the data quality issue into a production data stream of the production data and delivering the production data stream. In one embodiment, an anomalous data element in the production data may be replaced with a corrected data element in the production data stream.

In one embodiment, the non-transitory computer readable storage medium may also include instructions stored thereon, which when read and executed by one or more computer processors, cause the one or more computer processors to notify a data owner of the data quality issue by out of band notification.

In one embodiment, the data quality constraint may be identified from a mapping of constraints to rich data types.

In one embodiment, the data quality constraint may be applied to a plurality of the columns.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
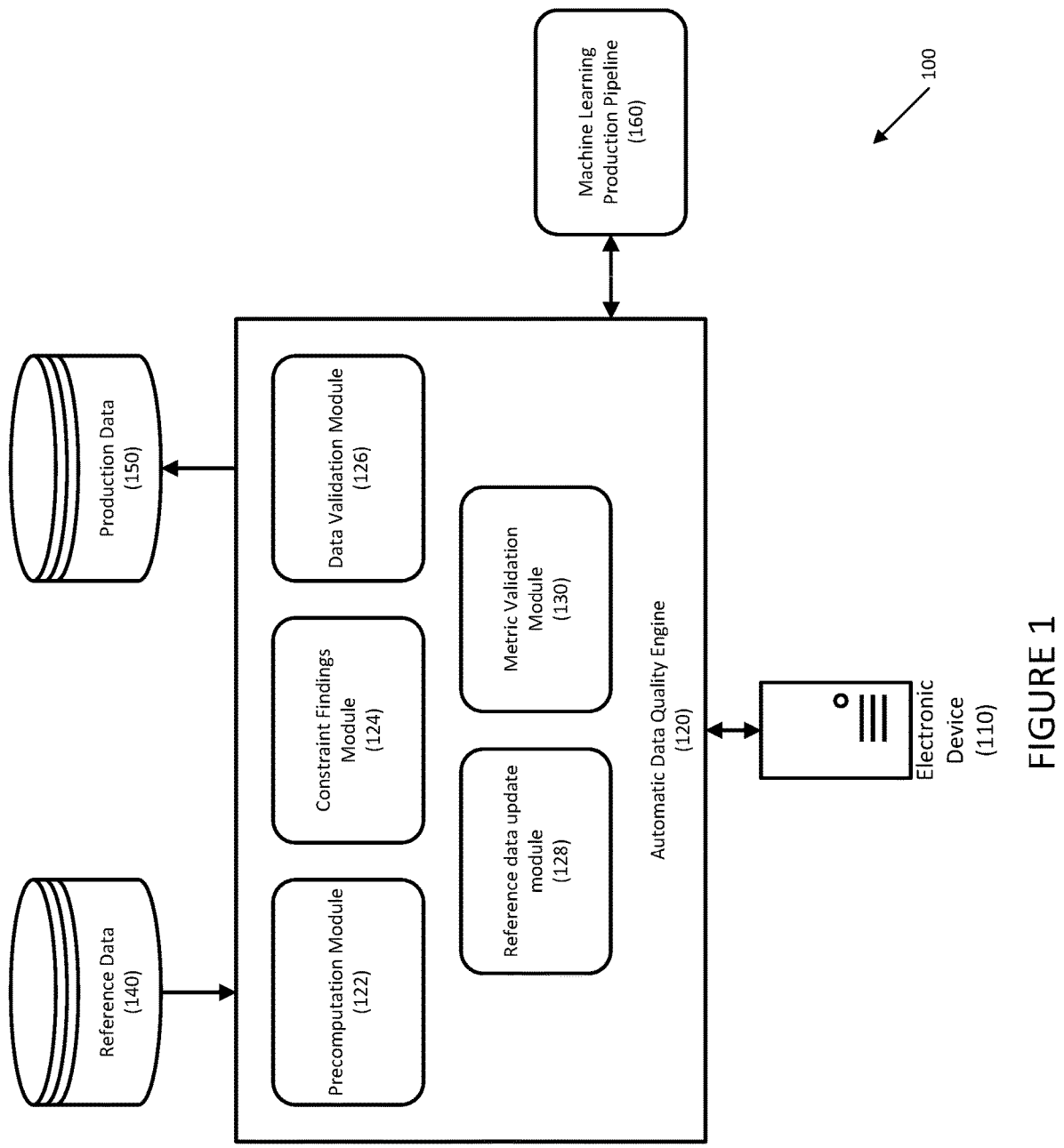
FIG. 1 depicts a system for automated data quality semantic constraint identification using rich data type inferences according an embodiment.

Embodiments generally relate to systems and methods for automated data quality semantic constraint identification using rich data type inferences.

The disclosure of Villarreal-Vasquez, et al., "AutoDQ: Automatic Data Quality for Financial Data," NeurIPS Data-Centric AI Workshop (2021) is hereby incorporated, by reference, in its entirety.

As used herein, a "semantic data type" refers to basic data types, such as string, integer, floating point, Boolean, etc. A "rich data type" refers to a semantic data type that has a specific format, content constraint, and/or specific application. Examples of rich data types include a credit score, a social security number, an employee identifier, an IP address, etc.

Embodiments relate to automatic data quality (DQ) functions including DQ detection, DQ monitoring, DQ metrics, and DQ correction of enterprise data organized by schema with possible associated meta data where the automation is based in-part or in-full on machine-learning based techniques. The data may be incomplete, may be arbitrarily selected from a larger set of the data, etc.

Data quality may have a one or more data quality dimension, including completeness, accuracy, consistency, integrity, validity, timeliness, relevance, accessibility, semantics, reliability, etc. Each quality dimensions may have a known metric. The metrics may be computed by, for example, unit tests or pre-processing operations. The values for the metrics may be compared to one or more thresholds, including historical values, as part of the data quality assessment.

Embodiments may determine a rich data type attribute of a data field and may then use the rich data type information to identify semantic checks for data quality checks on data assigned to that field.

A data field may have a name and a collection of records. The data field is typically a part of a data set that may contain many other fields organized into records. Each record may have a unique record id, a date and/or timestamp, and/or meta data. Data fields may be automatically labeled with a rich data type, and the rich data type for a data field may be determined using heuristic-based generate-and-test or search.

New rich data types and their heuristics may be automatically discovered.

The rich data type may be a field label. Each rich data type may have associated therewith semantic constraints that may be automatically applied to data assigned to that field. In embodiments, the semantic constraints may be applied to data. Violations of constraints are potential DQ issues.

Constraints may include, for example, constraints on a single column, such as statistic constraints (e.g., completeness, uniqueness, skew, etc.), rich type constraints (e.g., isTimestamp, isURL, isPhonenumber, etc.), etc. Constraints may also include constraints on multi column patterns, such as comparative (e.g., a spread of bid column and ask column is normally positive), monotonic (e.g., a company's cumulative sales follows a monotonic increasing pattern), allowed state-transition (e.g., account status cannot go from close state to pending state), predictability based on a derived column, hierarchical relationship between columns (e.g., age group column (child, adult, senior) is determined by age column), etc. Constraints may also include time-series constraints, such as anomaly detection using historical data to compare with a model-based forecast.

Constraints may also include constraints on graph representation of data records or objects. Examples of data that is conveniently represented as a graph (e.g., nodes, edges) are social networks, enterprise networks, business workflows, organizational structure, and electronic transactions. The relationships in data may be implicit or explicit. Structured data may be processed to determine or infer entities and their relationships. These inferred relationships and entities may then be represented as a graph in a graph database. Data quality metrics for graph datasets may be computed on both the underlying structured data and the graphical representation. DQ metrics for graphs are needed for ensuring that the graph represented data has consistent, correct, and reliable content and organization. Graph DQ metrics are related to but are different than DQ metrics for structured data, and include measures on all types of graph properties.

Constraints may also include constraints on meta data data-quality, such as data continuity, data volume over time, collections of data organized by aggregation type, relational properties, etc.

Embodiments may expand the range of data quality checks into semantic level, and may enable the automation of semantic DQ checks.

Embodiments may further identify rich types using heuristics which may improve efficiency.

FIG. 1 depicts a system for automated data quality using semantic constraint identification using rich data type inferences according to an embodiment. For example, system 100 may include electronic device 110, which may be any suitable electronic device, including servers (e.g., physical and/or cloud-based), computers (e.g., workstations, desktops, notebooks, tablets, etc.), smart devices, Internet of Things (IoT) appliances, etc. Electronic device 110 may execute automated data quality engine 120, which may include a plurality of software modules, including precomputation module 122, constraint finding module 124, data validation module 126, reference data update module 128, and metric validation module 130.

Precomputation module 122 may receive reference data from reference data source 140 and may perform the training of classification, regression, and/or time-series based models, compute statistical thresholds, and extract rich data types from the reference data for future use over production data, for example, a classifier or regressor that may be trained on a per column basis, semantics extraction using rich type inferences, statistics computation and threshold estimation, and anomaly detection training for anomaly detectors in data validation module 126.

Constraint finding module 124 may receive models and performance metrics from the classifier and/or regressor, and may perform predictability analysis. It may receive specialized data types from the semantics extraction and may identify semantics-based constraints on single/multiple columns. Constraint finding module 124 may receive statistical metrics and thresholds from the statistical and computation and threshold estimation and may identify statistical-based constraints on single or multiple columns.

Data validation module 126 may receive constraints from constraint finding module 124 along with the models and thresholds required for their execution and may receive production data from production data source 150. Using the production data and the constraints, data validation module may perform unit tests and may detect anomalies. If anomalies are found, the anomalies may be identified. If the unit tests pass and there are no anomalies, the production data may be validated and provided to a downstream system, such as machine learning production pipeline 160. The validated data may also be provided to reference data update module 128, which may update reference data in reference data source 140.

Metric validation module 130 may receive statistical metrics and thresholds from precomputation module 122, which, over time, will represent time series of metrics and/or thresholds. These time series may be applied to find deviation or sudden changes on these values, that is, unexpected peaks and valleys.

Figure 2:
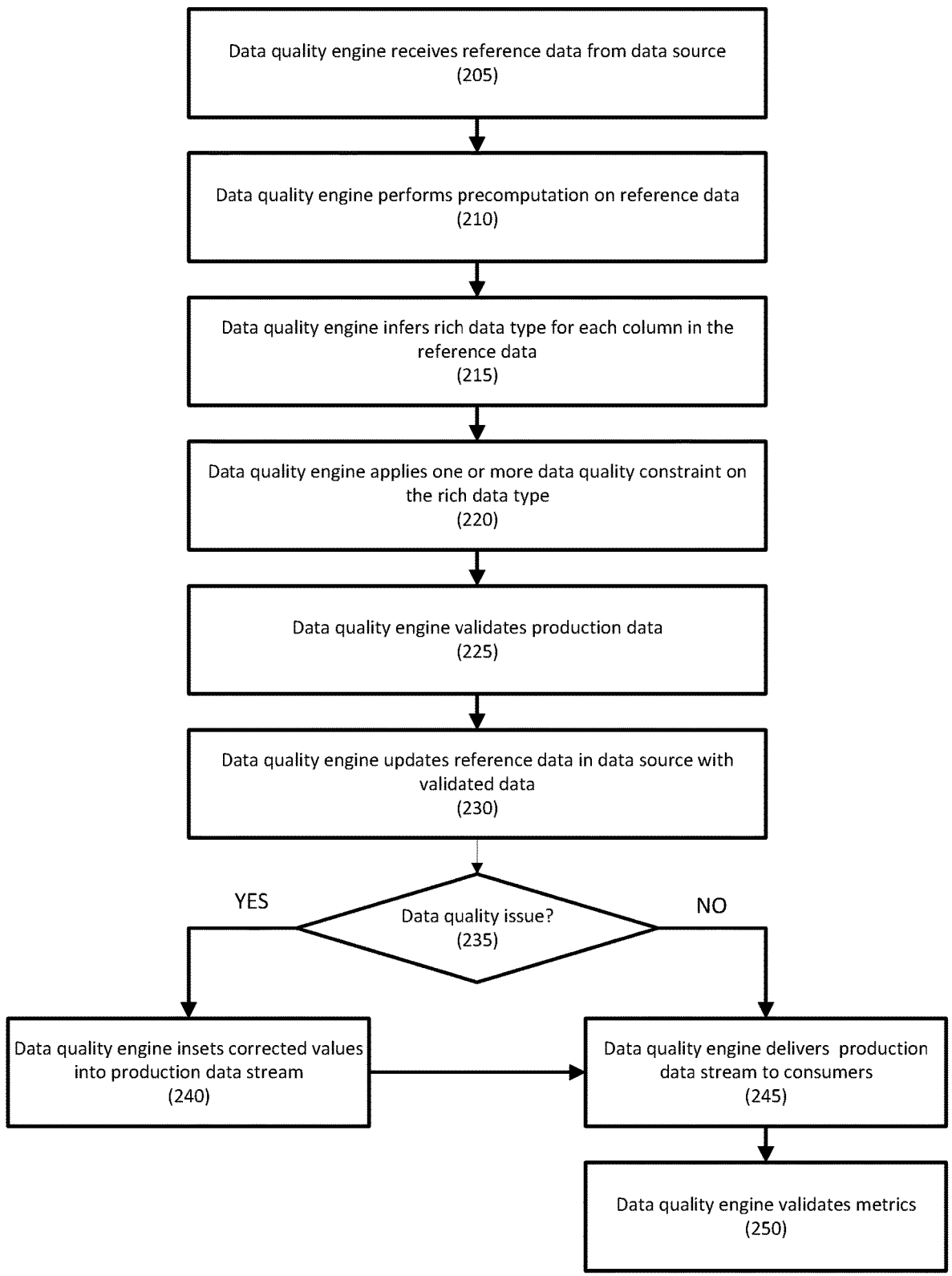
FIG. 2 depicts a method for automated data quality semantic constraint identification using rich data type inferences according an embodiment.

Referring to FIG. 2, a method for automated data quality using semantic constraint identification using rich data type inferences is disclosed according to an embodiment. In step 205, a computer program, such as a data quality engine, may receive reference data from a data source. In one embodiment, the reference data may include tabular data.

In step 210 the computer program may perform one or more precomputations on the reference data. For example, the computer program may perform classification and/or regression on the reference data using, for example, a classifier or regressor that may be trained on a per column basis. The computer program may extract semantics using rich data type inferences, may compute statistics and estimate thresholds, etc. In one embodiment, the computer program may detect anomalies in the reference data, and may train anomaly detectors using this information.

The computer program may take the reference data as its input, and may output different artifacts. For example, a model may be trained for each column vector in a tabular dataset. The model may be a classifier or a regressor based on the type of data (e.g., string, integer, etc.) in the column. Embodiments may compute metrics, such as accuracy, F1-score, Mean Squared Error (MSE), Root Mean Squared Error (RMSE), etc.

In step 215, the compute program may infer a rich data type for each column. Examples of rich data types may include date, date-time, time, category, url, json, html, latitude, longitude, email, IP address, street address, phone number, social security number, bank routing number, etc. In embodiments, the thresholds may be configurable so that users may specify the thresholds for an occurrence frequency of conforming values.

The computer program may infer rich data types based on the formatting of the cells in the column, column name heuristics, pattern matching such as regular expressions to check for match, and/or consistency with other columns in table. For example, many types of information stored as or having base type "string" or "VARCHAR" or "CHAR" may have strict formatting patterns that may be used to identify the rich data type. Examples of such formatting patterns include Vehicle Identification Numbers (VIN), phone numbers, internet IP address, latitude, longitude, social security number, email address, etc.

As another example, the rich data types may also be inferred using one or more pre-defined heuristics about the meta data, schema, data characteristics, etc. For example, a column of integer data may have a column name that includes 'score' or 'credit_score', 'crdt_scr', etc. Data values of the same column may have a range from 0 to 800. Other columns in the table may be credit or loan related. Thus, the column's rich data type may be inferred to be 'credit score'.

New rich data types may be created for unlabeled instances.

After the data types and rich data types have been computed, data quality characteristics may be computed by one or more algorithm, including, bivariate, multi-variate, data drift, point anomalies, contextual anomalies, sequence anomalies, space and time outlier, distance metrics (including graph similarity and distance), etc. For example, bivariate may determine whether a statistical association exists between two fields. Multi-variate may determine statistical inter-relationships among several fields. Data drift may identify unexpected and undocumented changes to data structure, semantics, and/or infrastructure. Point anomalies may identify an individual point that may be considered as an anomaly compared to the rest of the data.

Once the rich data type is inferred, in step 220, data quality constraints tests that are specific to this rich type may be applied to the data. Examples of data quality constraint tests may include testing whether a payment history consistent with credit score, testing whether a credit score is consistent with income, testing whether a distribution of credit scores consistent with historical distribution of applicants, etc.

For example, based on the inferred rich data types and deterministic patterns in the dataset, such as column group, column age, etc., embodiments may identify a mapping of the data type to one or more constraint for the rich data type. The constraints may be on a single column, patterns across multiple columns, on time-series, on graph representations, on metadata, etc.

Embodiments may identify and suggest different patterns, such as (1) comparative (e.g., spread of bid column and ask column are usually positive), (2) monotonic (e.g., company cumulative sales follows a monotonic increasing pattern), (3) state transition (e.g., account status cannot go from close to pending state), etc.

For statistics-based constraints, using multiple public datasets from rich data type, distinctness, average standard deviation, skewness, kurtosis, and other statistics are extracted, a rule-based mechanism that recommends statistical single and multicolumn constraints, along with their previously computed thresholds, may be applied.

In step 225, the computer program may validate the production data. For example, the computer program may validate the production data through a set of unit tests devised to verify whether the data complies with the suggested constraints and through, for example, the generated anomaly detectors.

In step 230, the computer program may update the reference data with validated production data from step 225. For example, a batch of future production data may be received and validated, and then appended to the reference data. By analyzing the incremental data as new batches arrive and by keeping the reference data up to date, timeliness may be achieved.

In one embodiment, some or all of validated production data may be added to existing reference data.

In step 235, if there is a data quality issue, in step 240, the computer program may insert corrected values into a production data stream to correct the identified data quality problem. In one embodiment, the computer program may report the data quality issue using, for example, out of band reporting to a data manager, may flag the production data as having a data quality issue, etc. The reporting may be instead of or in addition to the insertion of the corrected values.

For example, in a time-series sequence, an anomalous value may be replaced with an average of two adjacent values.

As another example, a rich data type "credit score" value may be found to be significantly inconsistent with related fields for same account such as average income, credit transaction history, payment history. The credit score value may be replaced with an estimate using, for example, an estimation function that uses other variables, averaging accounts in same cluster, etc.

As yet another example, a categorical column may have 100 unique values across 10 million rows. The rich data type inference has determined that the categorical column is application names with (recovery time objective) RTO=2. A count metric may determine that some of the 100 values occur only once or twice in the 10 million rows. A string analysis may show that one of these rare values is highly likely to be misspelling of another value. The misspelled value may be replaced with the corrected spelling.

As still another example, syntax differences (e.g., values that are inconsistent with associated fields in same row, with temporally related values, or the overall population of values in the column, etc.) may be corrected, removed, etc.

Other suitable corrections, including using a forecasting model for time-series corrections, clustering data and using data from the cluster, etc. may be implemented as is necessary and/or desired.

In embodiments, certain constraints may be placed on the correction, such as limiting the corrections to a low frequency corrections so that too many "errors" are not corrected, which may result in a higher risk associated.

In step 245, the production data stream may be delivered to consumers of production data.

If there is no data quality issue, the production data stream may be delivered to consumers in step 245.

In step 250, the computer program may validate metrics. For example, a metric, such as average, range, skew, etc. may be computed. The value may be compared to metric value computed for reference data. If the metric on the production data is outside of the acceptable values determined for the reference data, then the production data is not validated.

Figure 3:
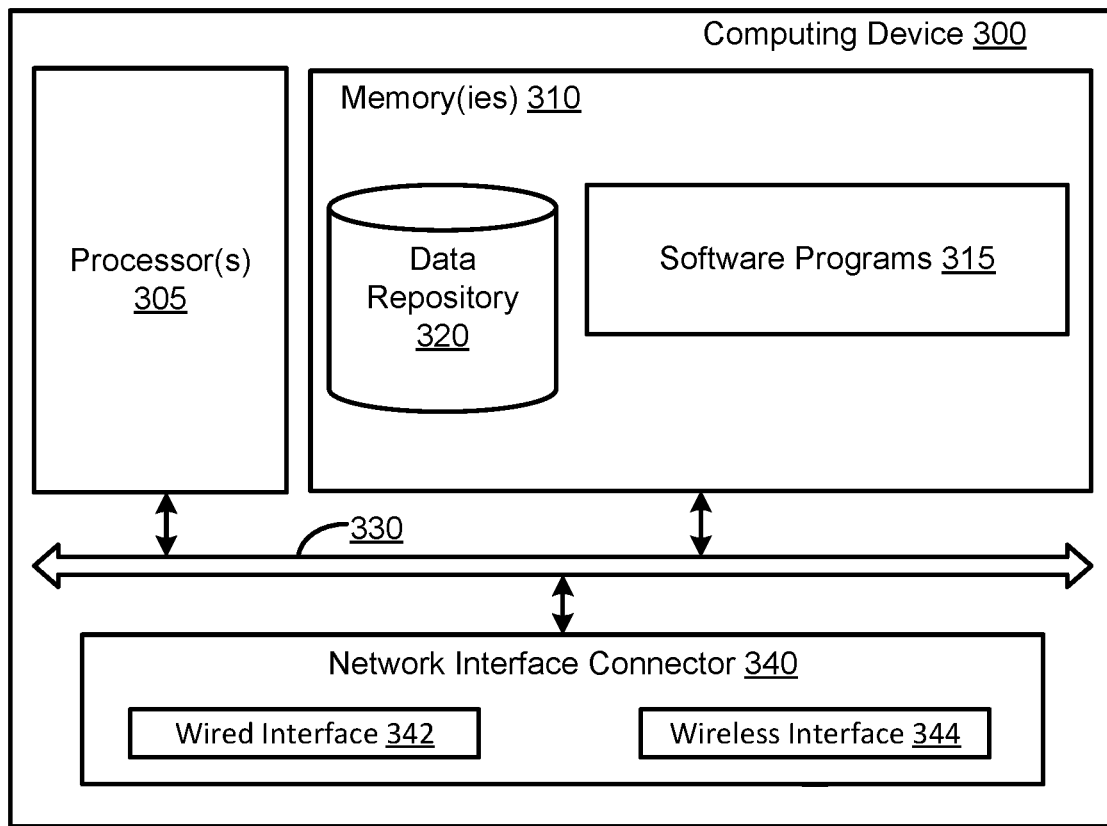
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein, including, for example, backend 112. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been disclosed, it should be recognized that these embodiments are not exclusive to each other, and features from one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated data quality analysis, comprising:
    receiving, by a data quality engine computer program, reference data from a data source, wherein the reference data comprises a plurality of columns;
    inferring, by the data quality engine computer program and from the reference data, a rich data type for each of the plurality of columns, wherein the rich data type has a specific format, a content constraint, and/or a specific application;
    applying, by the data quality engine computer program, a data quality constraint to each column based on the rich data type for the column;
    updating, by the data quality engine computer program, the reference data with production data; and
    identifying, by the data quality engine computer program, a data quality issue in the production data.

2. The method of claim 1 wherein the rich data type for a first column of the plurality of columns is based on a format of the first column, column name heuristics, pattern matching, and/or consistency of data in the first column with a second column of the plurality of columns.

3. The method of claim 1, wherein the production data is validated using one or more unit test.

4. The method of claim 1, wherein the step of identifying a data quality issue in the production data comprises determining whether the production data complies with the data quality constraint using one or more unit test.

5. The method of claim 1, wherein the step of identifying a data quality issue in the production data comprises detecting an anomaly in the production data.

6. The method of claim 1, further comprising:
    correcting, by the data quality engine computer program, the data quality issue in the production data by inserting corrected values to correct the data quality issue into a production data stream of the production data and delivering the production data stream.

7. The method of claim 6, wherein the data quality engine computer program replaces an anomalous data element in the production data with a corrected data element in the production data stream.

8. The method of claim 1, further comprising:
    notifying, by the data quality engine computer program, a data owner of the data quality issue by out of band notification.

9. The method of claim 1, wherein the data quality constraint is identified from a mapping of constraints to rich data types.

10. The method of claim 1, wherein the data quality constraint is applied to a plurality of the columns.

11. A non-transitory computer readable storage medium, including instructions stored thereon, which when read and executed by one or more computer processors, cause the one or more computer processors to perform steps comprising:
    receiving reference data from a data source, wherein the reference data comprises a plurality of columns;
    inferring, from the reference data, a rich data type for each of the plurality of columns, wherein the rich data type has a specific format, a content constraint, and/or a specific application;
    applying a data quality constraint to each column based on the rich data type for the column;
    updating the reference data with production data; and
    identifying a data quality issue in the production data.

12. The non-transitory computer readable storage medium of claim 11, wherein the rich data type for a first column of the plurality of columns is based on a format of the first column, column name heuristics, pattern matching, and/or consistency of data in the first column with a second column of the plurality of columns.

13. The non-transitory computer readable storage medium of claim 11, wherein the production data is validated using one or more unit test.

14. The non-transitory computer readable storage medium of claim 11, wherein identifying a data quality issue in the production data comprises determining whether the production data complies with the data quality constraint using one or more unit test.

15. The non-transitory computer readable storage medium of claim 11, wherein identifying a data quality issue in the production data comprises detecting an anomaly in the production data.

16. The non-transitory computer readable storage medium of claim 11, further including instructions stored thereon, which when read and executed by one or more computer processors, cause the one or more computer processors to correct the data quality issue in the production data by inserting corrected values to correct the data quality issue into a production data stream of the production data and delivering the production data stream.

17. The non-transitory computer readable storage medium of claim 16, wherein an anomalous data element in the production data is replaced with a corrected data element in the production data stream.

18. The non-transitory computer readable storage medium of claim 11, further including instructions stored thereon, which when read and executed by one or more computer processors, cause the one or more computer processors to notify a data owner of the data quality issue by out of band notification.

19. The non-transitory computer readable storage medium of claim 11, wherein the data quality constraint is identified from a mapping of constraints to rich data types.

20. The non-transitory computer readable storage medium of claim 11, wherein the data quality constraint is applied to a plurality of the columns.

* * * * *